United States Patent Office 2,900,182
Patented Aug. 18, 1959

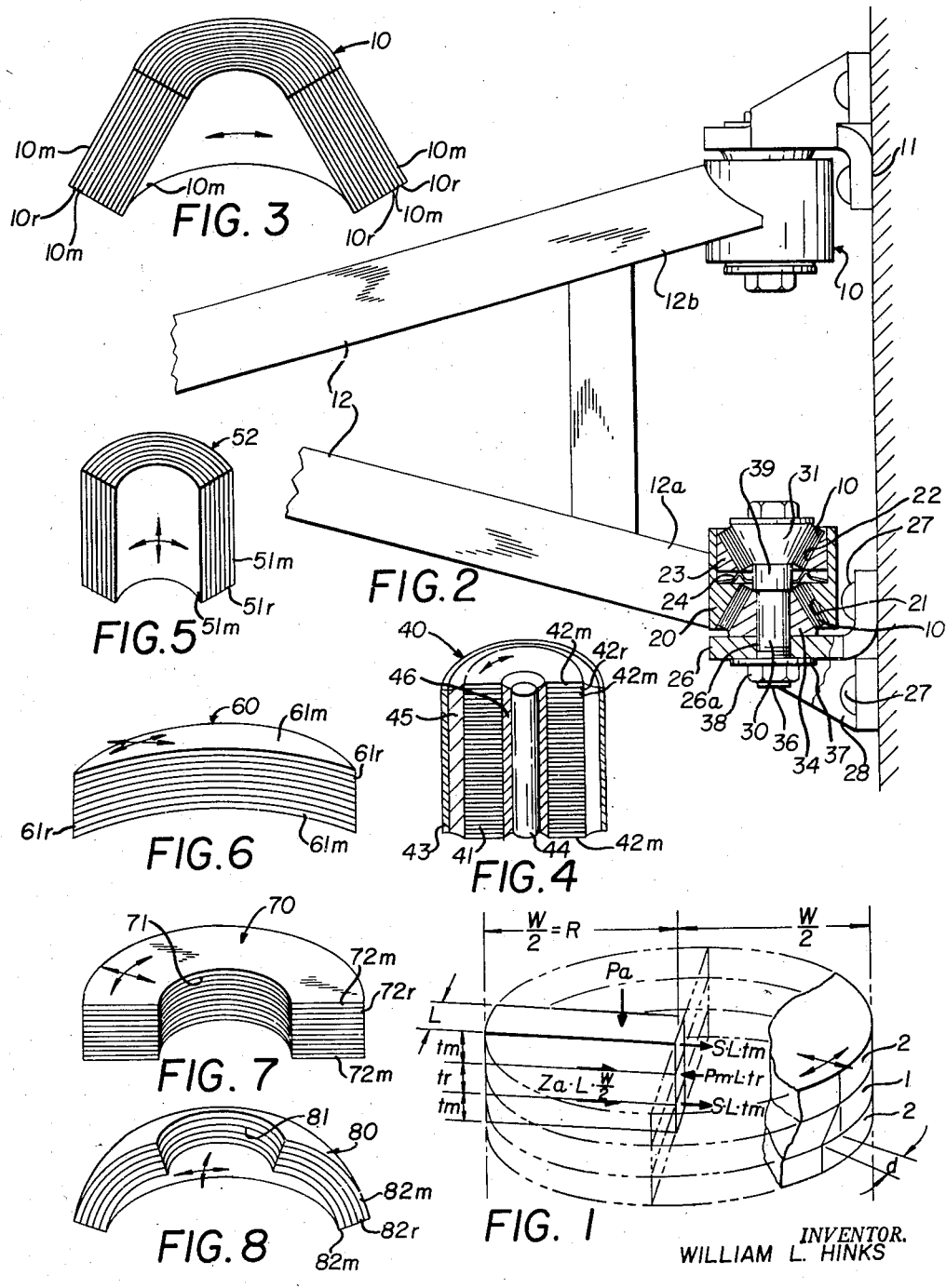

2,900,182

STATIC LOAD BEARINGS

William L. Hinks, Cuyahoga Falls, Ohio

Application April 27, 1955, Serial No. 504,324

13 Claims. (Cl. 267—57.1)

This invention relates to bearings, and has particular reference to the design and construction of new and improved types of static load bearings.

In the field of bearing supports, static load bearings are normally employed as a support connection between two or more parts that are restricted in their relative movement therebetween. Accordingly, at the present time, thrust bearings are employed, for example, for the purpose of receiving, and subsequently transmitting the thrust forces from the point of origin to the point of application, while permitting said relative movement.

As a result of the above field of use, it is manifest that static load bearing units, and in particular, thrust bearings per se, are subjected to the influence of compound forces during their usage; and as a result the overall design thereof must be such that the same can withstand the pressures created by these compound forces. Accordingly, it is manifest that such bearings must first possess sufficient load bearing properties to have a high resistance to compression, thus permitting the same to carry a high load. This load bearing property is expressed in terms of compression resistance, in view of the fact that a highly compressible bearing would be unsatisfactory in commercial use because the dimensions of the same would vary too much upon loading to allow its accepted usage.

As a second point of design, such bearings must necessarily possess a small or negligible resistance to the relative movement between the parts adjacent to the bearing. Indeed, the ordinary reason for use of any bearing is to allow such unrestrained movement.

Other necessary prerequisites for the use of static load bearings in many applications include small dimensions, low cost, long life, allowance of wide temperature variations, and large dimensional tolerances of both bearing and supports.

Provision of a static load bearing incorporating the desirable features as are above outlined is accordingly the principal object of this invention; and the additional objectives of this invention include the provision of such a bearing of simplified design, resulting in a low cost production item that is capable of wide-spread commercial application.

Additional objects of the invention will become more apparent upon a reading of the following brief specifications, considered and interpreted in the light of the accompanying drawings.

Of the drawings:

Figure 1 is a perspective drawing, most of which is shown in phantom to illustrate forces and deflections occurring on and within a typical laminated bearing.

Figure 2 is a plan view partly broken away and in section and illustrating an application of use for the improved bearing of this invention.

Figure 3 is an enlarged perspective cross-sectional view of the improved bearing employed in Figure 2 of the drawings.

Figure 4 is a cross-sectional view of a tall laminated bearing provided with a novel means of lateral support.

Figure 5 is a perspective view of a modified form of the invention.

Figures 6, 7, and 8 are perspective cross-sectional views illustrating modified forms of the invention.

It has been discovered that the aforementioned objectives can be obtained by the use of a bearing designed and constructed in accordance with the theories set forth in conjunction with Figure 1 of the drawings.

Such theory, in essence, contemplates the use of a bearing consisting of layers of an elastomeric material 1, interspersed between, and preferably bonded to, sheets or plates or metal 2, 2, to form a stack of as many laminations as desired for a particular application. For clarity, only three layers are depicted in Figure 1. A load is applied at one surface perpendicular to the plates and transmitted through the laminations to the opposite extremity. Any two of the plates in the stack may be caused to move relatively with each other because of the small shear force resistance of the rubberous material between. This deflection or rotation of two adjacent plates will be proportional to the total deflection or rotation applied to the entire stack of laminates. Numerous shapes of bearings making use of this principle are possible and will be further explained as this disclosure proceeds.

In order to permit high unit loadings with negligible compression and to prevent extrusion of the rubberous material from between the plates, while allowing satisfactory deflection characteristics, the bearing must be designed to comply with certain dimensional ratios which have been found to be controlling in such design. Specifically, it has been found that the following dimensional ratios must be considered in the design of a laminated bearing such as is taught and disclosed by this invention:

*First*, the ratio between the smallest unbroken width of an elastomer layer and the thickness of such layer must be considered. This ratio must in general be large enough to allow the desired results. In Figure 1 the ratio has been shown disproportionately small for purposes of illustration. In practices the thickness of the metal and rubber would be less, on the order of 5% to 50% as thick, or less.

*Second*, the ratio of thickness between the adjacent layers of metal and elastomer must be considered.

*Third*, the ratio between the allowable peripheral deflection of a single layer of rubber with respect to the thickness of such layer must be considered. This ratio will be involved in the determination of the required number of laminates in the bearing.

To determine the acceptable numerical ratios, a method of analysis will be illustrated by the development of certain equations for the special case represented by Figure 1. The designations which will follow define the working parameters or variables and are applicable to any configuration of the static load bearing. In consideration of the first design ratio above listed, the following apply:

$t_r$ = thickness of rubber
$W$ = smallest unbroken width dimension of an elastomeric layer
$A$ = area of force application
$F$ = force applied perpendicular to laminate
$P_a$ = average pressure perpendicular to laminate = $F/A$
$P_m$ = maximum pressure in rubber
$Z_a$ = average horizontal shear stress in rubber
$Z_m$ = maximum horizontal shear stress in rubber
$L$ = an increment of depth of the laminate It will be seen that for equilibrium of the center rubber strip selected for force analysis in Figure 1 (no unbalanced forces in the horizontal direction), the shear forces $$Z_a \cdot L \cdot \frac{W}{2}$$

on both walls of the rubber have to be balanced against the pressure force $P_m.L.t_r$ which in this case is maximum at the center of the lamina, or $$\Sigma F = 0$$
$$\therefore P_m.L.t_r - (Z_a.L.W/2).2 = 0$$
$$\frac{W}{t_r} = \frac{P_m}{Z_a}$$

Now let $$Z_a = K_z Z_m$$

where $K_z$ is a factor of proportionality between the average and maximum shear stresses. $K_z$ is always less than 1.

Also let $$P_m = K_p P_a$$

where $K_p$ is the factor relating the maximum horizontal pressure in the rubber layer to the average pressure exerted on the bearing face. $K_p$ is always greater than 1.

Substituting:

$$\frac{W}{t_r} = \frac{K_p P_a}{K_z Z_m} = \frac{K_p F}{K_z Z_m A}$$

This defines the smallest width-thickness ratio of the rubber layer which can be used without exceeding the allowable maximum shear stress in the rubber. With the inclusion of a factor to account for non-centered maximum pressure in the rubber, this would be applicable to most other shapes.

The maximum shear stress $Z_m$ that can be allowed must, of course, be less than the rubber-metal bond shear stress attainable or the ultimate shear stress of the rubber itself. Ordinarily, the controlling factor will be the "creep" or viscous behavior of the elastomer, due to the shear stress in it. This is a slow process, but in order to keep it negligible, and prevent slow extrusion of the elastomer from between the adjacent plates, the maximum shear stress must be kept below a certain limit, depending on the elastomeric compound used and the conditions of use (temperature, amount of bearing rotation, etc.).

Both $K_z$ and $K_p$ will depend on the shape of the bearing and the width-thickness ratio. They may be derived mathematically. Because of their dependence on the $W/t_r$ ratio, which is in itself the object of solution, the first-assumed values of $K_p$ and $K_z$ may be in error, so that an iterative process of successively closer approximations is required.

It is to be pointed out that the above relation defines only the minimum width-thickness ratio which can be used. Other considerations may demand a larger ratio. For instance, the compression resistance may have to be greater than it would be for the minimum ratio. To prevent the ingress of decomposition and aging of the rubber at the edges, the rubber thickness might be made less. It might be cheaper to use extra thin layers of metal and rubber.

Considering now the second design ratio above discussed, it will be seen from an examination of Figure 1 that the maximum compression force that is exerted on each rubber strip is in turn balanced by the tensile force in an adjacent metal strip. Using the following additional symbols defined below, a formula may be derived:

$S$ = tensile stress in the metal
$t_m$ = thickness of the metal
$\Sigma F = 0$ and therefore $$(S.L.t_m) \text{ minus} (P_m.L.t_r) = 0$$

so that $$\frac{t_m}{t_r} = \frac{P_m}{S}$$

but $$P_m = K_p P_a$$

so $$\frac{t_m}{t_r} = \frac{K_p P_a}{S} = \frac{K_p F}{SA}$$

If $S$ represents the maximum allowable tensile stress in the metal, then this formula expresses the minimum allowable ratio of metal thickness to rubber thickness. It is generally applicable to any shape of bearing.

The third design ratio deals with the number of laminates that are required to impart the proper torsional or sidewardly deflectional properties into the bearing. Let $N$ = number of layers of rubber.
$D$ = total deflection of the entire laminate at the periphery (arc distance).
$d$ = allowable deflection at the periphery of the bearing for a single thickness of rubber.
$R$ = radius of bearing.
$\theta$ = angle of rotation applied to bearing, degrees.

The deflection $d$ is pictorially represented in Figure 1.

From the above it will be seen that $$N = \frac{D}{d}$$

Inasmuch as it can be mathematically ascertained that $$D = \frac{R\theta}{57.3}$$

the required number of layers of rubber can be written also in terms of the angle of rotation which is to be placed on the bearing by substituting as follows:

$$N = \frac{R\theta}{57.3d}$$

then $$N = \frac{W\theta}{(2)57.3d}$$

since $$R = \frac{W}{2}$$

in this case.

It will now be shown that the value of $d$ is dependent on the rubber thickness. In fact, the ratio $d/t_r$ expresses the maximum shear strain placed upon the rubber. Also, the resultant stress is related to the strain through the shear modulus, $E_s$, of the rubber. Thus, the maximum value of $d/t_r$ which can be used is dependent on this resultant stress or strain in several ways:

First, the strain placed on the rubber must not cause rupture of the rubber or rubber-metal bond. The stress resulting from the deflection adds vectorially to the stress already existing due to the load. This may require consideration in some cases. A rule used for rubber in shear is that the ratio $d/t_r$ should not exceed 1 to 1.5. When the maximum deflection is seldom reached the value may be relatively large, but for repeated oscillation it would have to be smaller to prevent fatigue or overheating.

Secondly, the torque resulting from the deflection may need consideration if it must be kept negligibly low. It can be shown that the maximum torque due to deflection of the type of bearing of Figure 1 is essentially $$T = \frac{\pi E_s W^3}{16} \cdot d/t_r$$

Given a maximum possible value of torque, the maximum $d/t_r$ can be calculated. In some cases, however, the torque or spring action may be useful. Low temperatures have a considerable stiffening effect on some elastomers which would affect the torque.

Rather than rotation, a sideward displacement may be the relative movement applied to the opposite faces of the bearing in Figure 1. Arrows drawn on the top surface of the bearing shown in Figure 1 indicate this translational freedom of movement as well as the possible rotational movement. Analagous reasoning and methods of analysis similar to those above would apply in this case.

A practical case involving design of a laminated bearing of the type represented by Figure 1, in accordance with the above set forth formulae, is worked out in the following example, wherein certain assumed conditions are set forth. Assumptions:

(1) Loading, $F=8,000$ lb. max.
(2) Bearing diameter, $W=1.12$ in.
(3) $K_p=1.1$
(4) $K_z=.6$
(5) Maximum shear stress of rubber, $Z_m=50$ p.s.i.
(6) Design stress of metal, $S=12,000$ p.s.i. (mild steel)
(7) Required rotation, $\theta=\pm 25$ degrees (not rapidly variant)
(8) Rubber shear modulus, $E_s=60$ lb./in.$^2$
(9) Torque, T, must be no greater than 20 in.-lb.

First, the width-thickness ratio must be determined as follows:

$$\frac{W}{t_r}=\frac{K_pF}{K_zZ_mA}=\frac{1.1\times 8,000}{(.6)50\times \pi/4(1.12)^2}=296.0$$

so $$t_r=W/296=\frac{1.12}{296}=.00378 \text{ in.}$$

Next, the metal-rubber thickness ratio must be determined as follows:

$$\frac{t_m}{t_r}=\frac{K_pF}{SA}=\frac{1.1\times 8,000}{12,000\times \pi/4(1.12)^2}=.74$$

thus $$t_m=.74t_r=(.74)(.00378)=.0028 \text{ in.}$$

The use of a commercially available metal thickness of .003 in. would be indicated from the above calculations.

Now, the displacement-rubber-thickness ratio can be found as follows:

$$T=\frac{\pi E_s W^3}{16}\cdot d/t_r$$

$$20=\frac{3.14\times 60(1.12)^3}{16}\cdot \frac{d}{t_r}$$

$$\frac{d}{t_r}=1.21 \text{ and } d=1.21t_r$$

$$d=1.21(.00378)=.00458 \text{ in.}$$

Now the required layers of rubber can be calculated from the following, previously explained, formulae:

$$N=\frac{W\theta}{2\times 57.3d}$$

$$N=\frac{1.12\times 25}{2\times 57.3(.00458)}=53.4$$

indicating that 54 layers of rubber must be used. One composite layer, i.e., rubber and steel, is $.00378+.003=.00678$ in. thick. Therefore, the height of the bearing will be:

$$54(.00678)=.366 \text{ in.}$$

If a bearing of the same diameter were required to carry only 1/10 of the above load, or 800 lb., the required $W/t_r$ ratio would be less, but not necessarily $$\frac{296}{10}$$

since $K_p$ an d $K_z$ would change.

There exist several problems of design which were not considered in the preceding example.

The first of these problems is associated with the fact that elastomeric compounds possess a large coefficient of expansion due to changes in temperature. This coefficient of expansion is much larger than that of metals. Because of this fact, the design of the bearing and housing has to be such as to allow an amount of unrestrained expansion of the rubber layers proportional to the temperature range involved in use. The expansion of the bearing must necessarily be confined to one direction only, since the elastomer cannot expand by moving between the plates toward the periphery of the bearing because the previously developed design has established that the width-to-thickness ratio must be large enough to preclude such movement.

The second problem concerns the fact that a laminated bearing whose height is too large in relation to its width is subjected to an unstable, buckling tendency under load. When this condition is acute, the laminations move sideways out of line through shear strain of the rubber until the entire stack buckles out from under the load. This condition could be averted, however, by using suitable means for lateral restraint of the bearing, as will be hereinafter explained in greater detail when Figure 4 of the drawings is discussed.

A review of the above criteria and worked-out example involving the design of a laminated bearing indicates that the design must provide for and consider a number of factors. The following main specifications are necessary for the design of a laminated bearing:

(1) The load force to be applied and its direction.
(2) The permissible amount of movement, both axially and angularly.
(3) The allowable dimensions in shape.
(4) The frequency of movement.
(5) The temperature range.
(6) The allowable cost.
(7) The allowable tolerances.

For the purpose of determining the minimum range for the first of the previously developed design ratios, a definition of the meaning of the width-thickness ratio, as applied to a number of different shapes of the laminated bearing, is necessary.

It is not proffered that the width-thickness ratio is the only factor determinative of the possible load per unit area of a laminated bearing regardless of shape. Configuration does, to a certain extent, affect the load bearing properties of any such bearing. However, as a matter of general design, this ratio does serve as some basis of comparison for such bearings, it being remembered that special cases can affect the design as indicated.

To cite an exception, consider the simple disc bearing of Figure 1. This bearing has a particular diameter and rubber thickness. Consider next a bearing of identical dimension and differing only in that this second bearing has a hole in the center. If the hole is very small, it is obvious that the second bearing has nearly the same load-carrying capacity as the former, but has a width-thickness ratio which could be expressed as being less than half that of the former, because the width was defined in both cases as the minimum unbroken width of the rubber. In this excepted case, it is apparent that the effective width would, as previously defined, need to be restated as the entire diameter. Such a modified dimension would be used until the hole present was large enough to greatly change the load-capacity properties of the second bearing having the aperture. Accordingly, as far as uniformity with other shapes is concerned, the load-bearing properties can then most efficiently be expressed by considering the effective width to be the actual radial unbroken width of the washer-type bearing involved in this case.

Similar cases involving large variations in pressure capacity could be treated in an analogous manner.

In experimentation, it has been discovered that the desirable properties (ample pressure capacity and compression resistance) are most evidenced when $W/t_r$ is in excess of the numeral 40, although basic indications of such properties are found to occur in the range of numerical ratios extending between the numerals 20 and 40.

Turning now to an examination of Figures 2 and 3, there is illustrated a practical application of a laminated bearing that is constructed in accordance with the above discussed theories.

Accordingly, in Figures 2 and 3 of the drawings, two bearings 10, 10 are employed as component elements of support connection between a frame 11 and each of the respective ends 12a, 12b of a yoke arm 12 that attaches to the wheel (not shown) of an automobile, in known manner. A spring and shock absorber that would ordinarily also be connected to yoke 12 are not shown, for the sake of clarity.

Each bearing 10 is illustrated as being of frusto-conical configuration, and is further illustrated as being of laminated metallic-elastic construction, wherein successive layers $10_r$, $10_r$ of elastical rubber are separated by layers $10_m$, $10_m$ of metal, it being apparent that the remaining bearings 10, not shown in Figure 2 of the drawings, are similar in construction. Arrows in Figure 3 indicate the allowable type of movement of the bearing.

The support connection illustrated in Figure 2 of the drawings is shown as including a fixed head 20 defined by the end 12a of a yoke 12, and including an internal conical seat 21 within which the bearing 10 may be seated with the external surface thereof, engaging against a seat 21. A second internal conical seat 22 is similarly provided in a block 23 that is capable of relative movement with respect to the fixed head 20, the arrangement being such that the fixed head 20 and the movable block 23 are separated by a compressible washer 24, to thus permit the fixed head 20 and the movable block 23 to be moved towards each other as load bearing force is applied during assembly.

For the purpose of interconnecting the bearings 10, 10 with the support 11 to provide a support bearing of the character desired, the frame 11 is shown as including a flange 26 that is illustrated as being secured to frame 11 by the usual rivets 27, 27; a support plate 28 being employed for the purposes of reinforcing in known manner. The flange 26 is shown apertured as at 26a, for the purposes of receiving therethrough a stud 30, one free end of which defines a flared head 31 that is formed in frusto-conical configuration so as to complementally engage the inner surface of the bearing 10 that is received within the seat 22. By like token, a frusto-conical block 34 is shown surrounding the stud 30 and is butted against its shoulder 39 at a point intermediate the flared end 31 and the threaded end 36, to accordingly define a frusto-conical surface capable of engaging the internal surface of the conical bearing 10 that engages the conical surface 21.

The stud 30 is further illustrated as including the usual washer 37 and nut 38, for the purposes of tightening the same and maintaining the overall bearing support in the position of Figure 2.

In actual use in an automobile suspension system embodying the above referred-to assembly defining the new and novel support bearing 10 of this invention, it has been found that the bearing will be able to withstand a high application of load force, and will accordingly be able to help support the automobile per se, as defined by the frame 11 with respect to the wheel members (not shown). It is further obvious in this regard, that a certain amount of torsional movement of the yoke 12 will be permitted about the axis of the stud 30, corresponding to the deflections of the wheel due to road irregularities. In the event of a temperature change that would result in an expansion of the individual rubber layers $10r$, $10r$, provision is made to compensate for this expansion by permitting the member 23 to move with respect to the fixed head 20 as a result of these members being separated by the compressible spring 24. In this manner, changes in temperature can be compensated for without resulting in the premature failure of the bearing. This manner of assembly also permits substantial tolerances in the bearing and housing parts alike.

It will be seen from the preceding paragraphs that there has been provided a new and novel type of support bearings for static loads, that is characterized by the presence of load bearing properties normally found in metallic bearing supports while additionally and simultaneously providing a bearing that possesses the resilient properties normally expected of rubber under a shear or torsional force. It has been shown how this combination of desirable properties results in the production of a relatively simple commercial bearing, capable of being utilized in several fields of manufacture with new and novel results.

Discussion has thus far centered around the disc-type bearing as in Figure 1, and the conical type in the preceding example.

Other modifications in shape, having the same principle are illustrated in Figures 4, 5, 6, 7 and 8. Each of these is a metallic-elastomeric laminate having alternate layers of rubber and metal wherein the width-thickness ratio is important as previously pointed out, and is subject to the same type of analysis set forth in regard to the previous discussion of Figure 1. The same novel results are obtained wherein a bearing is provided that is characterized by a high compression resistance while additionally possessing a low resistance to shear. In all of the above figures, directional arrows indicate the freedom of motion associated with the particular bearings.

Accordingly, in Figure 4 of the drawings, there is illustrated a "tall" laminated bearing having means provided therein for providing resistance against lateral displacement or "buckling" of the bearing when the same is under load.

This modified form of the invention includes an axially elongated laminated bearing 40, one component part of which includes a metallic-elastic laminate 41 made up of alternate discs of rubber 42r, 42r that are separated by interspaced discs 42m, 42m of metallic material, the arrangement being such that the discs 42r and 42m have the same planar configuration, although it is apparent that the thickness thereof can vary in accordance with the previously discussed theories.

For the purpose of preventing buckling of the laminate 41, the same is shown surrounded in spaced relationship by a cylindrical shell 43, while the internal cavity of the laminate 41, as defined by the aligned apertures in the stacked discs 42m and 42r, receives, in spaced relationship, a cylindrical rod (or tube) 44, the arrangement being such that rubber sleeves 45 and 46 are respectively contained in the spacing outside and inside the laminate 41 as defined by the shell 43 and rod 44. In this manner, rigid lateral support is provided internally and externally on the laminate to thus prevent buckling of the same when under high axial load. It is apparent that either the shell 43 or the rod 44, with their associated rubber sleeves 45 or 46, could be eliminated if the load requirements were small enough. In the latter case, the aperture in laminate 41 would be unnecessary, unless desired. Additionally, it is apparent that the shell 43, rubber sleeves 45 and 46, laminate 41 and rod 44 could all be bonded into an integral unit. Also, the rubber members 45 and 46, while indicated as being unitary sleeves, could also be provided in a series of rings to define grooves and lands.

It is not necessary that the laminate 41 be formed of flat discs. It is apparent that the laminations could be of conical configuration as for a "tall" bearing of the type in Figure 3, or of spherical configuration, as will be hereinafter explained in conjunction with Figures 6 and 8. In any case, when a "tall" bearing would be required for purposes of large rotation or small torque, the lateral restraint afforded by the inner and/or outer sleeves would be necessary.

The modified form of the invention illustrated in Figure 5 of the drawings is one sector 52 of a full circle of such bearings. The alternate rubber and metal layers 51r and 51m are disposed in radially adjacent relationship about the axis of said circle. Because of the previously discussed effects of thermal expansion, a complete, unbroken cylindrical bearing is impracticable, since there is little possibility of adequate expansion without rupture of the metallic laminations. For such a unitary bearing of tubular configuration, an elastomer of very low expansion would be necessary, in connection with metallic layers of very high expansion factor. Similarly, a low ratio of width to thickness, as well as a relatively constant temperature would aid in providing such a unitary bearing for practical application, if at all possible.

For most cases, however, the segmented construction, wherein a plurality of quadrant sections 52 make up the tubular bearing, would be necessary. It is understood that the quadrants are supported with respect to each other by known means that provide requisite allowance for expansion.

Figure 6 defines a bearing 60 of shallow spherical configuration and having laminate layers 61r, 61m of elastomer and metal, respectively. The dished contour of this modified form of the invention allows the absorption of loads as shown in Figure 1, and additionally, this bearing, due to its contoured shape, can assume a certain amount of side load.

The modified form of the bearing 70 that is illustrated in Figure 7 of the drawings, is similar to that shown in Figure 1 of the drawings, with the exception that the same contains a central aperture 71 that is defined by the alternate layers 72r and 72m of elastomer and metal, as previously discussed. As long as the aperture 71 remains relatively small, the dimension W (see column 2, line 58) can be considered as the diameter of the stacked laminate without detrimental results. However, when the aperture 71 becomes larger, W, as discussed, must be considered as the distance between the inner and outer edge portions of the layers 72r, 72m.

Figure 8 defines a bearing 80 that has a spherical configuration conforming somewhat to the shape of the bearing 60 in Figure 6, although of greater concavity, and characterized by the presence of a central aperture 81. As such, it is similar to the conical bearing 10 of Figure 3, except that it allows movement in any direction about its spherical center, rather than just rotation about its axis. Layers 82r and 82m of elastomer and metal, respectively, make up the bearing 80.

A comparison of the novel laminated bearing disclosed herein with other types of bearings which are used in applications involving restricted relative movement reveals certain advantages of the former. For instance, the laminated bearing could often replace a ball or roller bearing at a fraction of the cost of the precision bearing. The dimensions required for carrying the same load might be smaller for the laminated bearing.

A summary of the advantages of the novel laminated bearing is presented below. The bearing:

(1) Can withstand very high pressures
(2) Has small deflection under load
(3) Has small resistance torque in most applications
(4) Has small dimensions and light weight
(5) Has long life
(6) Does not require lubrication
(7) Is low in cost
(8) Precludes need for precision tolerances in housings
(9) Is unaffected by dirt—can be made to resist oil
(10) Allows no backlash In automotive applications such as the preceding example of Figure 2, the fact that periodic lubrication is not required would be a large asset. Other places of use in this field might include universal joints for power transmission and ball joints for control linkages or wheel suspension. A ball and socket joint for the latter use could be formed by using two spherical bearings of the type in Figure 8 to fill the space between the ball and socket.

Other general fields of use would include farm construction and military machinery, railway and aircraft application, and production machinery.

Throughout this specification, the words "metallic," "elastomeric" and "rubberous" have been used in connection with the description of the laminate layers that make up the structure of the respective bearing units disclosed in this invention. It is to be understood that when the term "metal" is used it encompasses any one of a large group of metals, or even a non-metallic material, that is characterized by a high compression resistance, as well as a high resistance to stretching under tensile load. Similarly, when the term "elastomeric" or "rubberous" is used, it is intended to include any and all rubber base products as well as all equivalent resilient products that could be used and which are characterized by a relatively low resistance to shear.

Modifications of the invention may be resorted to without departing from the spirit thereof or the scope of the appended claims.

What is claimed is:

1. A laminated bearing having shear spring properties, comprising; alternate layers of metal and elastomer bonded to each other; said elastomer layers being uniform in thickness and being substantially incompressible whereby the spacing between said metal layers is maintained substantially constant notwithstanding the application of force urging said metal layers towards each other; said elastomer layers yielding to shear forces whereby said metal layers may shift relatively of each other while the spacing between the same is maintained substantially constant.

2. A laminated bearing having shear spring properties, comprising; alternate layers of metal and elastomer bonded to each other; the width thickness ratio of each said elastomer layer being such that the same resists partial extrusion from between said adjacent metal layers; said elastomer layers being uniform in thickness and being substantially incompressible whereby the spacing between said metal layers is maintained substantially constant notwithstanding the application of force urging said metal layers towards each other; said elastomer layers yielding to shear forces whereby said metal layers may shift relatively of each other while the spacing between the same is maintained substantially constant.

3. A laminated bearing having torsion spring properties, comprising; alternate discs of metal and elastomer bonded to each other arranged around a common axis; each such elastomer disc being uniform in thickness and being substantially incompressible whereby said entire bearing will be substantially incompressible to forces applied axially thereof while yielding to forces applied through a plane that is substantially normal to said axis.

4. A laminated bearing having torsion spring properties, comprising; alternate layers of elastomer and metal bonded to each other and arranged about a common axis to define a body having an axial length; the thickness of each such elastomer layer being identical and being such that the same is substantially incompressible to forces applied axially of said body; said body yielding to torsion forces.

5. The device of claim 4 further characterized by the presence of means for preventing radial deflection of said body during the application of axial load forces thereto.

6. The device of claim 5 further characterized by the fact that said means include a rigid shell surrounding said body throughout its axial extent.

7. The device of claim 6 further characterized by the fact that said shell is spaced from said body with a resilient body being interposed between the internal surface of said shell and the peripheral edges of said layers.

8. The device of claim 4 further characterized by the fact that each said layer is centrally apertured with said apertures defining a central opening in said body.

9. The device of claim 8 further characterized by the fact that an inflexible rod is axially disposed within said central opening.

10. The device of claim 9 further characterized by the fact that said inflexible rod is spaced from said apertures with a resilient body being interposed between said rod and said peripheral edges of said apertures.

11. A laminated bearing having shear spring properties, comprising; alternate layers of metal and elastomer bonded to each other; said elastomer layers being uniform in thickness and being substantially incompressible whereby the spacing between said metal layers is maintained substantially constant notwithstanding the application of force urging said metal layers towards each other; said elastomer layers yielding to shear forces whereby said metal layers may shift relatively of each other while the spacing between the same is maintained substantially constant; each said layer being arched across a transverse dimension thereof.

12. A laminated bearing having torsion spring properties, comprising; alternate layers of metal and elastomer bonded to each other; said elastomer layers being uniform in thickness and being substantially incompressible whereby the spacing between said metal layers is maintained substantially constant notwithstanding the application of force urging said metal layers towards each other; said elastomer layers yielding to torsion forces whereby said metal layers may shift relatively of each other while the spacing between the same is maintained substantially constant; each said layer being frustroconical in configuration.

13. A laminated bearing having shear spring properties comprising; alternate layers of metal and elastomer bonded to each other; said elastomer layers being uniform in thickness and being substantially incompressible whereby the spacing between said metal layers is maintained substantially constant notwithstanding the application of force urging said metal layers towards each other; said elastomer layers yielding to shear forces whereby said metal layers may shift relatively of each other while the spacing between the same is maintained substantially constant; each said layer defining, in cross-section an arc of a circle.

References Cited in the file of this patent

UNITED STATES PATENTS

| | | |
|---|---|---|
| 1,647,428 | Atwood | Nov. 1, 1927 |
| 1,868,818 | Eksergian | July 26, 1932 |
| 2,051,864 | Knox et al. | Aug. 25, 1936 |
| 2,126,707 | Schmidt | Aug. 16, 1938 |
| 2,203,342 | Sloman et al. | June 4, 1940 |
| 2,207,465 | Leighton | July 9, 1940 |
| 2,216,455 | Piron | Oct. 1, 1940 |
| 2,533,176 | Oelkers | Dec. 5, 1950 |
| 2,625,389 | Signorini | Jan. 13, 1953 |
| 2,719,711 | Nallinger | Oct. 4, 1955 |
| 2,786,670 | Hammond | Mar. 26, 1957 |